A. INGRAM.
RECEPTACLE CLOSURE.
APPLICATION FILED MAR. 19, 1914. RENEWED FEB. 6, 1918.

1,265,451.

Patented May 7, 1918.
3 SHEETS—SHEET 1.

Attest:
C. S. Mitchell
A. A. Robins 6/13/1913

Inventor:
Alfred Ingram,
by Rogers, Kennedy & Campbell,
his Attys.

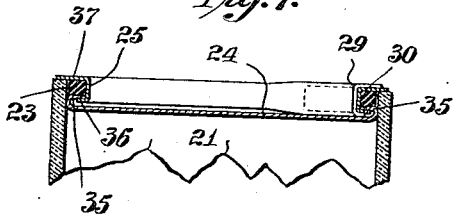
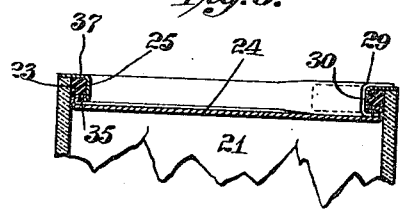
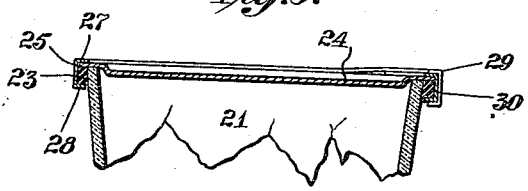
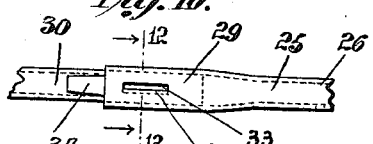
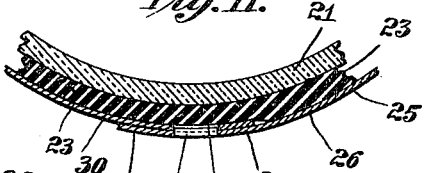
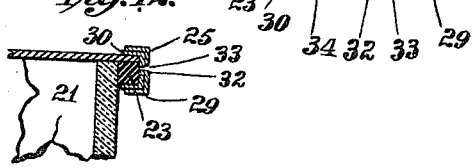
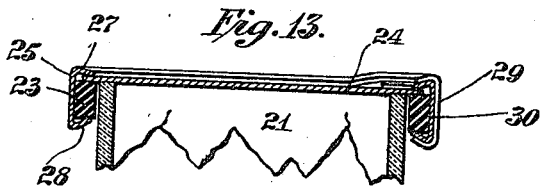
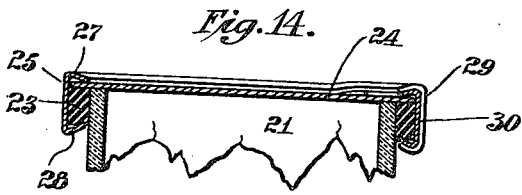

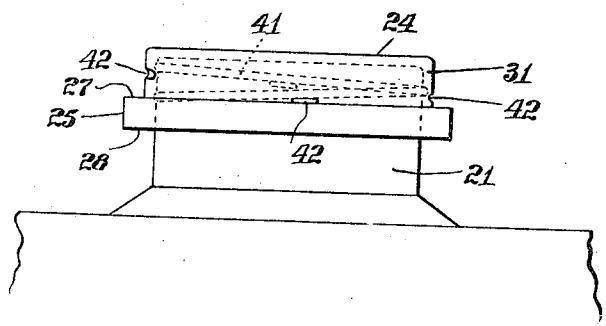
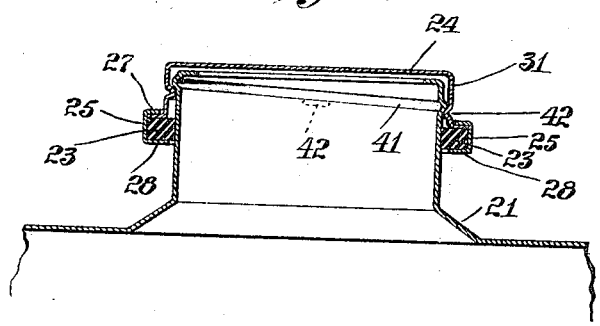

UNITED STATES PATENT OFFICE.

ALFRED INGRAM, OF BROOKLYN, NEW YORK.

RECEPTACLE-CLOSURE.

1,265,451. Specification of Letters Patent. Patented May 7, 1918.

Application filed March 19, 1914, Serial No. 825,751. Renewed February 6, 1918. Serial No. 215,732.

*To all whom it may concern:*

Be it known that I, ALFRED INGRAM, a citizen of the United States, residing at Brooklyn, in the county of Kings and State of New York, have invented certain new and useful Improvements in Receptacle-Closures, of which the following is a specification, reference being had therein to the accompanying drawing.

This invention relates to receptacle closures, by which is meant the means for closing or sealing bottles, jars, cans and the like.

An object of the present invention is to improve the efficiency of, and increase the simplicity of receptacle closures, and to afford a closure which is simply and economically applied. It is a further object to cheapen the sealing of receptacles by reducing the amount of material necessary and otherwise.

Another object hereof is to enable the sealing of a receptacle by means of a plastic annulus (*e. g.* rubber) which is compressed into place against the wall of the receptacle by a contraction of the metallic portion of the closure. This circumferential contraction or pressure toward the wall of the receptacle is distinguished from a mere vertical compression of a portion of a mass of rubber to squeeze the rubber laterally into contact with the receptacle.

A closure constructed in accordance herewith may be efficiently employed in combination with ordinary smooth walled tumblers, either cylindrical or preferably conically shaped with the larger end at the top or mouth.

Other objects of the present invention will be referred to in the hereinafter following description, or will be apparent to those skilled in the art to which the invention pertains.

First will be described forms of receptacle closure embodying this invention, and thereafter the novel features will be pointed out in the claims.

In the accompanying drawings forming a part hereof Figure 1 is a top view of a receptacle to which the closure of this invention has been loosely applied.

Figure 5:
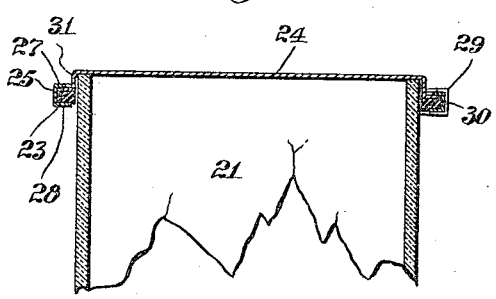
Fig. 5 is a sectional view of a modified form of the improvement.
Figure 6:
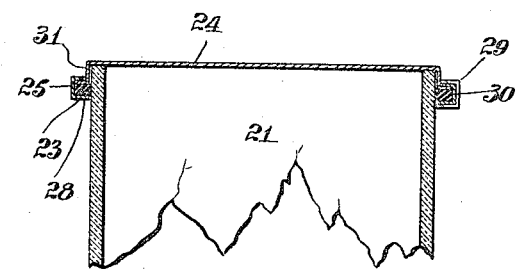

Fig. 6 corresponds to Fig. 5, but shows the parts after closure.

Fig. 7 represents an analogous application of this invention to a properly constructed bottle neck interior, this being in vertical cross section.

Fig. 8 is a similar view showing the parts of Fig. 7 in clenched position.

Figure 2:
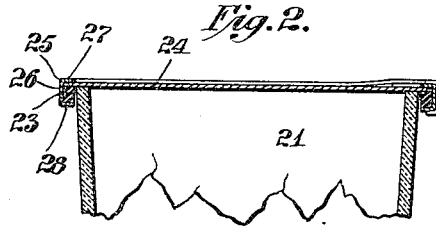
Fig. 2 is a vertical section thereof through the central plane of Fig. 1.

Fig. 9 shows a form of cover disk in which the center is struck downwardly instead of being flat as in Fig. 2.

Figs. 10, 11 and 12 show how, instead of merely clenching the parts, they may be securely locked in sealed position by a tongue and groove, Fig. 10 being an elevation, Fig. 11 a horizontal section and Fig. 12 a vertical section of this modification.

Fig. 13 is a view similar to Fig. 2 but of a modification in which the clamping ring flanges are inclined; and Fig. 14 shows the same after clenching.

Fig. 15 shows the invention hereof applied to the sheet metal receptacle having also screw engaging means; and Fig. 16 is a central cross section thereof.

Similar reference characters designate corresponding parts in the several views.

The tumbler 21 is preferably flared as stated, and with this invention no special engaging rib or shoulder is required, the exterior of the tumbler being smooth walled. Any other form of receptacle might be employed, and the invention will also be operative with a cylindrical tumbler 22.

Besides its metallic portions, the closure of this invention comprises a plastic annulus or a continuous ring of rubber designated 23. This invention operates on the principle of compressing the rubber annulus into place or flattening it against the wall of the receptacle by a contraction of the metallic portion of the closure toward the receptacle wall.

By a plastic annulus is meant any piece of compressible material capable of being made to surround the receptacle and be compressed against the receptacle wall; and in addition to rubber, many materials might be employed, such as compositions of cork, paper, etc., or leather, blotting paper or other material.

Generally speaking, the metallic portions of this closure comprise what may be termed the cover disk 24 of any desired shape, and the contracting rim or member 25 which both holds the disk and is contracted in the sealing operation. While not necessarily so the contracting member is preferred to be a separate piece and to overlie the disk as shown.

The drawings illustrate the member 25 as having its main portion or generally cylindrical wall 26 and its two flanges or their equivalent. The upper flange designated 27 overlies and holds the disk 24 in place. The under flange 28 underlies the plastic annulus 23.

Figure 1:
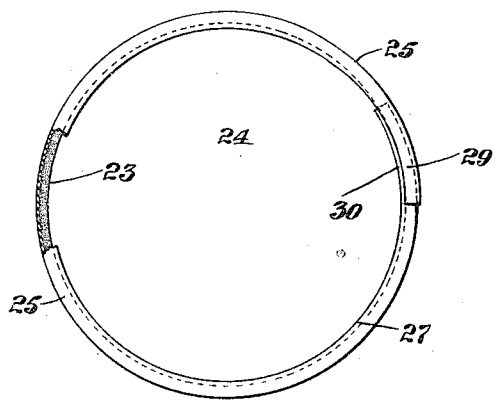

In Figs. 1 and 2 the parts are shown in the preliminary position ready to be applied to a receptacle. The closure fits easily. The receptacle may be filled with food stuffs, and if desired, may be located in a vacuum apparatus, and the closure lifted slightly to enable exhaustion of air, thereupon the contracting rim member 25 will be operated to seal the receptacle.

Rather than construct the member 25 as a continuous ring, it is shown as non-continuous. One of its ends 29 overlaps the other 30, thus permitting a relative sliding so that with a simple implement the ring may be mechanically contracted in circumference, thus shrinking or moving radially inward to flatten the rubber annulus against the receptacle wall as described. An implement for this purpose is not herein shown.

Figure 3:
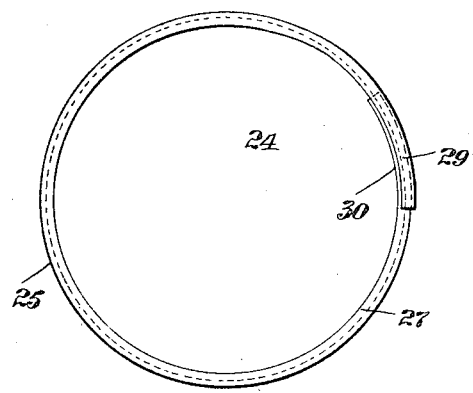
Fig. 3 is a view similar to Fig. 1, but after the closure or sealing of the receptacle has been effected.
Figure 4:
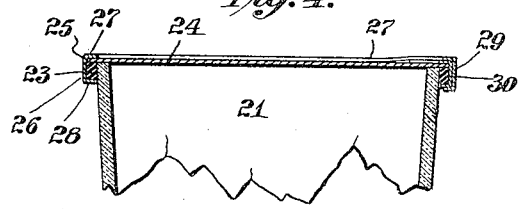
Fig. 4 is a vertical section on the central plane of Fig. 3.

Figs. 3 and 4 show the final position when the receptacle is properly sealed. The circumferentially contracted condition of the ring 25 is indicated. The space between its outer wall and the cover disk 24 is now closed, and the space between its lower flange 28 and the receptacle is substantially closed. This circumferential contraction and radially inward compression of the rubber, secures the desired sealing, and incidentally the sealing effect is rendered more perfect by the fact that the rubber is caused to press intimately against the cover disk 24 as well as against the upper part of the receptacle wall.

In order to secure the parts in their closed position, a clenching of the ring flanges may suffice. When the consumer desires to open the receptacle, it is merely necessary to unclench and disengage the ends of the contracting ring. When a cylindrically walled tumbler is employed, the cover disk 24 may have a dropped flange 31 at its periphery as shown in Figs. 5 and 6, so that when the parts are in closed position as in Fig. 6, the plastic material 23 will stand a substantial distance below the receptacle mouth, thus giving a certain latitude for accidental vertical displacement.

Instead of relying upon the clenching engagement of the ring flanges, one of the ends of the ring may be provided with a tongue 32 engaging in a slot 33 in the other end. The tongue and slot are so located that when compression has reached the proper point, the tongue drops into the slot as shown in Figs. 10, 11 and 12; or the tongue or slot or both might be produced by the compressing and sealing apparatus.

To facilitate disengagement, the outer ring end 29 may be provided with an unflanged integral extension 34.

Substantially the same description applies to the interior sealing illustrated in Figs. 7 and 8 excepting that in this case the cover disk 24 must be suitably modified, for example, by deflecting its rim upwardly and returning it inwardly, to give a flange 35 with which the holding flange 36 of the contracting ring may engage. The upper flange 37 of the ring 25 now serves the double function of confining the plastic annulus and resting upon the bottle mouth for positioning the closure.

It has been stated above that the receptacle cover disk and the contracting ring are of metal, but obviously this statement should be modified as equivalent rigid materials would serve, and in the case of the cover disk, different materials such as paper, specially treated or otherwise.

Owing to the advantageous structure of the closure herein described, it is found that it may be employed with receptacles varying considerably in diameter and roundness. For example, on a receptacle of seventy-five mm. in diameter, variations as large as from two to three mm. can be practically taken care of.

Figs. 13 and 14 show a modification wherein the clamping ring upper and lower flanges are of converging form both before and after clenching. Otherwise this structure is like that of Figs. 1 to 4.

In the modification of Figs. 15 and 16 the invention is shown applied to a tin can or canister 21. The downwardly flanged cover or cap 31 is provided with a helical rib 42 giving screw engagement with the corresponding rib 41 on the neck of the can. In applying this closure the cap will first be screwed down in place and thereupon the clamping ring will be contracted upon the plastic material 23 as before. After the consumer has opened the receptacle, the ring may be discarded and the screw thread forms a convenient means of thereafter screwing the cap in place.

It will thus be seen that there has above been described a receptacle closure operating on the principles hereof and attaining the objects and advantages before stated; but since details may be variously modified no limitation is desired to details excepting as set forth in the appended claims. It will be further understood that the dimensions shown in the drawings are not essential, and in fact for obvious reasons some of the dimensions have been exaggerated.

What is claimed and desired to be secured by Letters Patent is:

1. A receptacle closure including in combination with the receptacle, a cover, forming an angle with the receptacle wall, a plastic annulus adapted to contact both the receptacle wall and the cover in such angle, and a metallic contracting portion arranged with relation to said cover and annulus to be forcibly circumferentially contracted toward the receptacle wall, and when so contracted to compress the annulus flatwise between the metallic portion and receptacle whereby the plastic material is compressed against the wall and cover to seal the receptacle.

2. A receptacle closure including in combination with the receptacle, a cover, forming an angle with the receptacle wall, a plastic annulus adapted to contact both the receptacle wall and the cover in such angle, and a metallic contracting portion arranged with relation to said cover and annulus to be forcibly circumferentially contracted toward the receptacle wall, and when so contracted to compress the annulus flatwise between the metallic portion and receptacle whereby the plastic material is compressed against the wall and cover to seal the receptacle, said metallic portion being a flanged ring separate from the cover but overlying the cover, with leeway for contraction, and adapted to be secured when the receptacle is sealed.

In testimony whereof I affix my signature in presence of two witnesses.

ALFRED INGRAM.

Witnesses:
HENRY F. KLEINFELDT,
DONALD CAMPBELL.

Copies of this patent may be obtained for five cents each, by addressing the "Commissioner of Patents, Washington, D. C."